(12) United States Patent
Tinnin et al.

(10) Patent No.: US 9,845,105 B2
(45) Date of Patent: Dec. 19, 2017

(54) ADJUSTMENT MOUNTING BRACKET ASSEMBLY FOR STEERING COLUMN

(71) Applicant: Steering Solutions IP Holding Corporation, Saginaw, MI (US)

(72) Inventors: Melvin L. Tinnin, Clio, MI (US); Robert W. Dubay, Saginaw, MI (US); Donald A. Buzzard, Saginaw, MI (US); Matthew J. T. Vincent, Saginaw, MI (US); Michael P. Anspaugh, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/045,748

(22) Filed: Feb. 17, 2016

(65) Prior Publication Data

US 2017/0232996 A1 Aug. 17, 2017

(51) Int. Cl.
*B62D 1/184* (2006.01)
*B62D 1/187* (2006.01)

(52) U.S. Cl.
CPC ............. *B62D 1/187* (2013.01); *B62D 1/184* (2013.01)

(58) Field of Classification Search
CPC .................................. B62D 1/184; B62D 1/187
See application file for complete search history.

(56) References Cited

U.S. PATENT DOCUMENTS

| | | | | |
|---|---|---|---|---|
| 5,117,707 A | * | 6/1992 | Kinoshita | B62D 1/184 280/775 |
| 5,722,299 A | * | 3/1998 | Yamamoto | B62D 1/184 280/775 |
| 6,758,494 B2 | * | 7/2004 | Bannon | B62D 1/184 280/775 |
| 7,421,925 B2 | * | 9/2008 | Korzan | B62D 1/184 280/775 |
| 7,735,868 B2 | * | 6/2010 | Ridgway | B62D 1/184 280/775 |
| 8,714,047 B2 | * | 5/2014 | Yamamoto | B62D 1/184 280/779 |
| 9,481,390 B2 | * | 11/2016 | Martinez | B62D 1/195 |

* cited by examiner

*Primary Examiner* — Laura Freedman
(74) *Attorney, Agent, or Firm* — Cantor Colburn LLP

(57) ABSTRACT

An adjustment mounting bracket assembly for a steering column includes a mounting bracket mountable to a steering column mating element, the mounting bracket having a bracket aperture configured to receive a clamp bolt therethrough, the mounting bracket also having an arcuate slot. The bracket assembly also includes a spacer having a spacer aperture configured to receive the clamp bolt therethrough to align the spacer with the mounting bracket, the spacer having a first engaging feature disposed within the arcuate slot of the mounting bracket and a second engaging feature engageable with a recess of the steering column, disposal of the first engaging feature within the arcuate slot and disposal of the second engaging feature within the recess restricting the degree of freedom of the mounting bracket relative to the steering column.

17 Claims, 3 Drawing Sheets

ADJUSTMENT MOUNTING BRACKET ASSEMBLY FOR STEERING COLUMN

BACKGROUND OF THE INVENTION

The embodiments described herein relate to steering columns and, more particularly to an adjustment mounting bracket assembly for such steering columns, as well as a method of controlling an orientation of a mounting bracket relative to a steering column prior to installation of the steering column into a vehicle.

Steering column designs commonly use a mounting bracket that allows adjustment or relative motion of a mating element. The relative motion between the mounting bracket and the mating element may be constrained with fewer degrees of freedom (DOF) after installation into the vehicle structure. Prior to installation into the vehicle structure, the added DOF may allow the mounting bracket to move to a less desirable position or orientation relative to the mating steering column element. The undesired movement can make assembly into the vehicle more difficult, cause damage to components that are packaged around the mounting bracket and mating element, create improper positioning for material handling equipment or shipping containers, or prevent proper seating of the mounting bracket against the vehicle structure. Spring features that provide lift to the mating steering column element can increase the tendency for the mounting bracket to shift to an unintended position.

SUMMARY OF THE INVENTION

According to one aspect of the invention, an adjustment mounting bracket assembly for a steering column includes a mounting bracket mountable to a steering column mating element, the mounting bracket having a bracket aperture configured to receive a clamp bolt therethrough, the mounting bracket also having an arcuate slot. The bracket assembly also includes a spacer having a spacer aperture configured to receive the clamp bolt therethrough to align the spacer with the mounting bracket, the spacer having a first engaging feature disposed within the arcuate slot of the mounting bracket and a second engaging feature engageable with a recess of the steering column, disposal of the first engaging feature within the arcuate slot and disposal of the second engaging feature within the recess restricting the degree of freedom of the mounting bracket relative to the steering column.

According to another aspect of the invention, a steering column assembly includes a lower jacket, the lower jacket having a recess located at an end of the lower jacket. Also included is an upper jacket telescopingly engaged with the lower jacket in an axial direction. Further included is a clamp bolt extending through the lower jacket in a transverse direction. Yet further included is a mounting bracket mounted to the lower jacket, the mounting bracket having a bracket aperture configured to receive the clamp bolt therethrough, the mounting bracket also having an arcuate slot. Also included is a spacer having a spacer aperture configured to receive the clamp bolt therethrough, the spacer having a first engaging feature disposed within the arcuate slot of the mounting bracket and a second engaging feature engageable with the recess of the lower jacket, disposal of the first engaging feature within the arcuate slot and disposal of the second engaging feature within the recess restricting the degree of freedom of the mounting bracket relative to the steering column.

According to yet another aspect of the invention, a method of controlling an orientation of a mounting bracket relative to a steering column prior to installation of the steering column into a vehicle is provided. The method includes coupling the mounting bracket to a steering column mating element. The method also includes disposing a spacer along an outer wall of the mounting bracket, the spacer having a spacer aperture configured to receive a clamp bolt therethrough to align the spacer with the mounting bracket. The method further includes disposing a first engaging feature of the spacer within an arcuate slot of the mounting bracket. The method yet further includes disposing a second engaging feature of the spacer within a recess of the steering column mating element, wherein disposal of the first engaging feature within the arcuate slot and the second engaging feature within the recess restricts the degree of freedom of the mounting bracket relative to the steering column.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, an adjustment mounting bracket assembly for a steering column is provided to constrain degrees of freedom of the mounting bracket relative to the steering column prior to installation in a vehicle, as will be appreciated from the disclosure herein.

Figure 1:
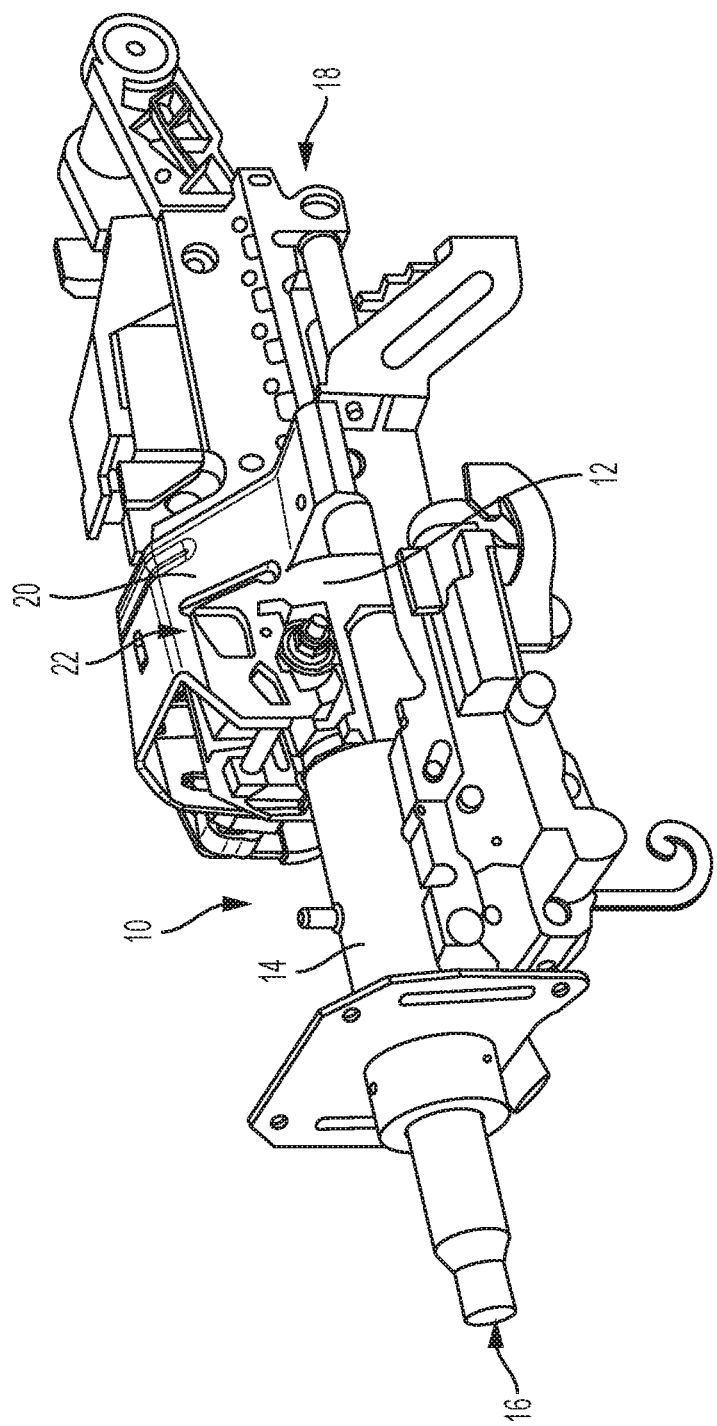
FIG. 1 is a perspective view of a steering column assembly.

Referring now to FIG. 1, a portion of a steering column is illustrated and generally referenced with numeral 10. The steering column 10 includes several components, including a lower jacket 12 and an upper jacket 14 that are telescopingly engaged with each other in an axial direction (i.e., longitudinal direction of steering column). A first side 16 of the portion of the steering column 10 is closer to the driver, where a steering wheel would be positioned. A second side 18 of the portion of the steering column 10 is closer to a steering gear.

The steering column 10 may be used in any type of vehicle that requires steering operation. A mounting bracket 20 is operatively coupled to the steering column to allow adjustment or relative motion of an element to which the mounting bracket 20 is mated (referred to herein as a "steering column mating element"). To avoid movement of the mounting bracket 20 to an undesirable position or orientation relative to the steering column mating element, an adjustment mounting bracket assembly 22 is provided and described herein.

Figure 2:
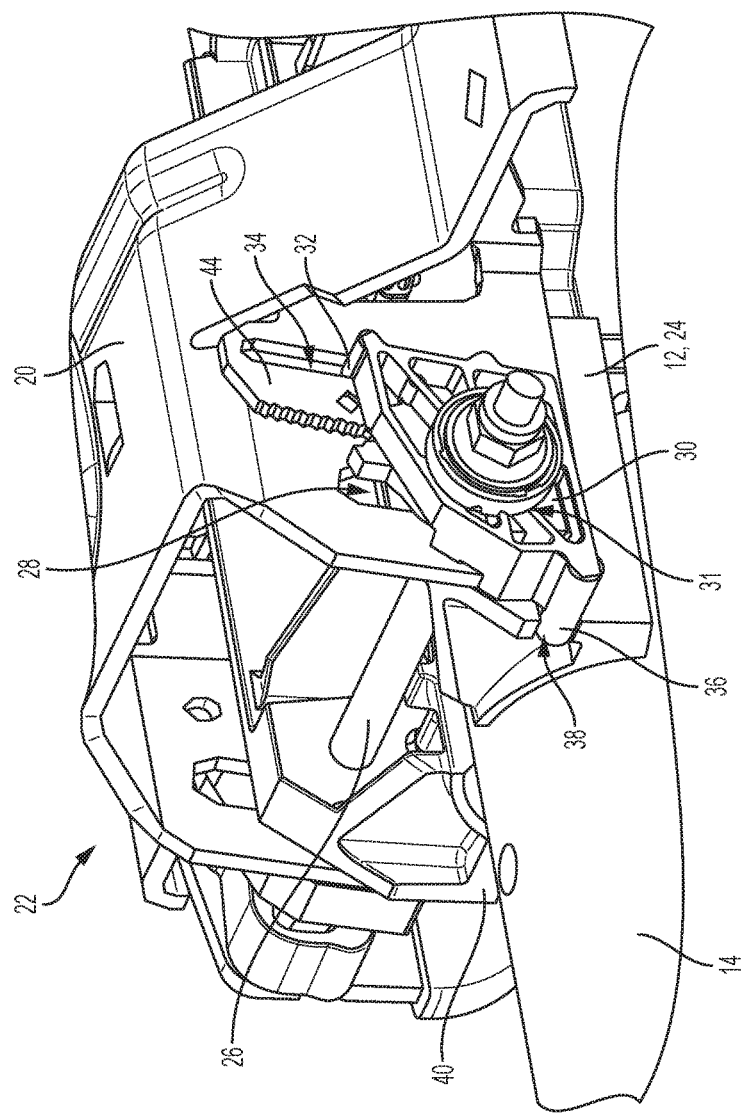
FIG. 2 is an enlarged perspective view of a mounting bracket mounted to a steering column according to an aspect of the invention.

Referring now to FIG. 2, the adjustment mounting bracket assembly 22 is shown in greater detail. The adjustment mounting bracket assembly 22 includes the mounting bracket 20 which is mountable to a steering column mating element. In the illustrated embodiment, the steering column mating element 24 is the lower jacket 12 of the steering column 10, but it is contemplated that the mounting bracket 20 is mounted to alternative steering column components in some embodiments. A clamp bolt 26 extends in a transverse direction through apertures of the lower jacket 12 and through bracket apertures 28 of the mounting bracket 20. Mounting with simply the clamp bolt 26 would allow rotational degree of freedom of the mounting bracket 20 relative to the steering column mating element (e.g., lower jacket 12). To constrain the degree of freedom, a spacer 30 includes retention features that interact with the mounting bracket 20 and the steering column mating element.

The spacer 30 includes a spacer aperture 31 configured to receive the clamp bolt 26 therethrough to align the spacer 30 with the mounting bracket 20. The spacer also includes a first engaging feature 32 that is disposed within a slot 34 of the mounting bracket 20. The first engaging feature 32 is also referenced herein as a first pin 32. It is to be appreciated that a round pin is merely an illustrative embodiment of the first engaging feature 32. The first engaging feature 32 may include any suitable alternative geometry. Disposal of the first pin 32 within the slot constrains rotation of the spacer 30 relative to the mounting bracket 20. The slot 34 is arcuate with a curvature that corresponds to a rake adjust axis of the steering column's primary adjustable elements, such as the lower jacket 12 and the upper jacket 14. Although it is contemplated that a single pin (i.e., first pin 32) is disposed in the slot 34, some embodiments include at least two pins to be disposed within the slot 34 to provide additional retention.

As described above, the spacer 30 is constrained from rotating relative to the mounting bracket 20 due to the first pin 32 being disposed within the slot 34. To link the motion constraint of these components to the steering column mating element (e.g., lower jacket 12), a second engaging feature 36 is disposed within a recess 38 of the steering column mating element. The second engaging feature 36 is also referenced herein as a second pin 36. It is to be appreciated that a round pin is merely an illustrative embodiment of the second engaging feature 36. The second engaging feature 36 may include any suitable alternative geometry. In the illustrated embodiment, the recess 38 is defined by an end 40 of the lower jacket 12 that is closest to the driver. The recess 38 may be an aperture that is not located at the end 40 of the lower jacket 12 in some embodiments.

Figure 3:
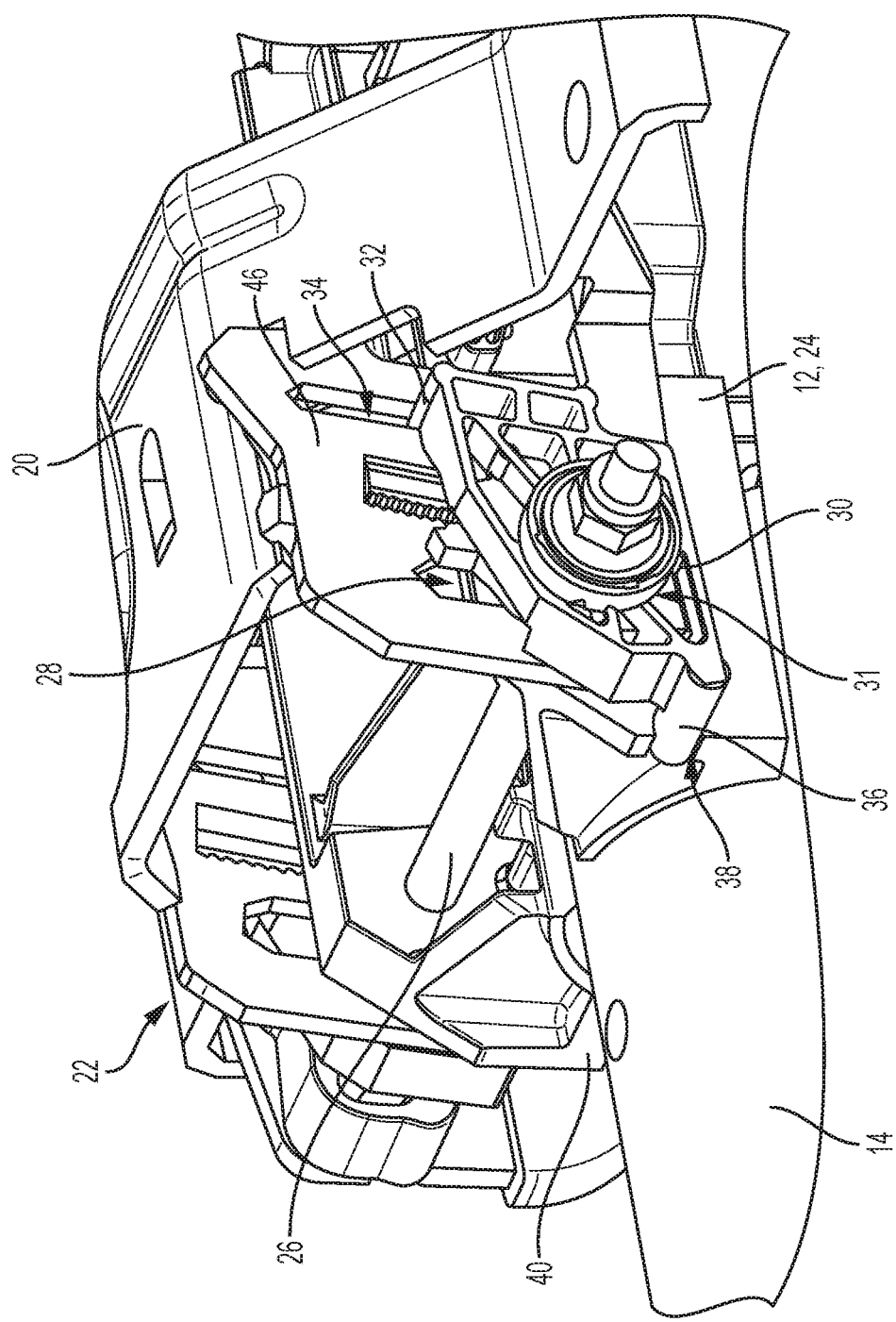
FIG. 3 is an enlarged perspective view of the mounting bracket mounted to the steering column according to another aspect of the invention.

In the embodiment illustrated in FIG. 2, the slot 34 is defined by an outer wall 44 of the mounting bracket 20. However, the slot 34 may be defined by an innermost wall 46 of the mounting bracket 20 in some embodiments, as shown in FIG. 3. The precise structure of the mounting bracket 20 may vary and the illustrative embodiments of FIGS. 2 and 3 are merely examples of locations for the slot 34.

The retention features described above limit the amount of movement that can occur between the mounting bracket 20 and the steering column mating element prior to the time that the mounting bracket 20 is affixed to a vehicle structure. The embodiments described herein also assist in the assembly process of the overall steering column 10 by helping to place the interfacing parts in proper position. After installation in the vehicle structure, the features remain engaged and allow for any required adjustment motion.

A method of controlling an orientation of the mounting bracket 20 relative to the steering column 10 prior to installation of the steering column 10 into a vehicle structure is also provided by the assembly process associated with the steering column, particularly the precise manner in which the mounting bracket 20 is mounted to the steering column 10 with the retention features described herein. In particular, the mounting bracket 20 is coupled to the steering column mating element. The spacer 30 is disposed along an outer wall of the mounting bracket 20 and the retention pins are disposed within the retaining structures 34, 38.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustment mounting bracket assembly for a steering column comprising:
   a mounting bracket mountable to a steering column mating element, the mounting bracket having a bracket aperture configured to receive a clamp bolt therethrough, the mounting bracket also having an arcuate slot; and
   a spacer having a spacer aperture configured to receive the clamp bolt therethrough to align the spacer with the mounting bracket, the spacer having a first engaging feature disposed within the arcuate slot of the mounting bracket and a second engaging feature engageable with a recess of the steering column mating element, disposal of the first engaging feature within the arcuate slot and disposal of the second engaging feature within the recess restricting the degree of freedom of the mounting bracket relative to the steering column.

2. The adjustment mounting bracket assembly of claim 1, wherein the spacer includes a plurality of engaging features disposed within the arcuate slot.

3. The adjustment mounting bracket assembly of claim 1, wherein the curvature of the arcuate slot corresponds to a rake adjustment axis of the steering column.

4. The adjustment mounting bracket assembly of claim 1, wherein the arcuate slot is defined by an innermost wall of the mounting bracket.

5. The adjustment mounting bracket assembly of claim 1, wherein the arcuate slot is defined by an outer wall of the mounting bracket.

6. The adjustment mounting bracket assembly of claim 1, wherein the recess of the steering column mating element is located at an end of a lower jacket of the steering column.

7. The adjustment mounting bracket assembly of claim 6, wherein the end of the lower jacket is the end of the lower jacket configured to be closest to a driver.

8. The adjustment mounting bracket assembly of claim 1, wherein the steering column mating element is a lower jacket of the steering column.

9. A steering column assembly comprising:
a lower jacket, the lower jacket having a recess located at an end of the lower jacket;
an upper jacket telescopingly engaged with the lower jacket in an axial direction;
a clamp bolt extending through the lower jacket in a transverse direction;
a mounting bracket mounted to the lower jacket, the mounting bracket having a bracket aperture configured to receive the clamp bolt therethrough, the mounting bracket also having an arcuate slot; and
a spacer having a spacer aperture configured to receive the clamp bolt therethrough, the spacer having a first engaging feature disposed within the arcuate slot of the mounting bracket and a second engaging feature engageable with the recess of the lower jacket, disposal of the first engaging feature within the arcuate slot and disposal of the second engaging feature within the recess restricting the degree of freedom of the mounting bracket relative to the steering column.

10. The steering column assembly of claim 9, wherein the spacer includes a plurality of engaging features disposed within the arcuate slot.

11. The steering column assembly of claim 9, wherein the curvature of the arcuate slot corresponds to a rake adjustment axis of the steering column.

12. The steering column assembly of claim 9, wherein the arcuate slot is defined by an innermost wall of the mounting bracket.

13. The steering column assembly of claim 9, wherein the arcuate slot is defined by an outer wall of the mounting bracket.

14. The steering column assembly of claim 9, wherein the end of the lower jacket is the end of the lower jacket configured to be closest to a driver.

15. A method of controlling an orientation of a mounting bracket relative to a steering column prior to installation of the steering column into a vehicle comprising:
coupling the mounting bracket to a steering column mating element;
disposing a spacer along an outer wall of the mounting bracket, the spacer having a spacer aperture configured to receive a clamp bolt therethrough to align the spacer with the mounting bracket;
disposing a first engaging feature of the spacer within an arcuate slot of the mounting bracket; and
disposing a second engaging feature of the spacer within a recess of the steering column mating element, wherein disposal of the first engaging feature within the arcuate slot and the second engaging feature within the recess restricts the degree of freedom of the mounting bracket relative to the steering column.

16. The method of claim 15, further comprising disposing a plurality of engaging feature within the arcuate slot.

17. The method of claim 15, wherein the steering column mating element comprises a lower jacket of the steering column.

* * * * *